US005935491A

United States Patent [19]
Tripathy et al.

[11] Patent Number: 5,935,491
[45] Date of Patent: Aug. 10, 1999

[54] GRADIENT-INDEX POLYMER RODS AND FIBERS

[75] Inventors: Sukant Tripathy, Acton; Kethinni G. Chittibabu, Lowell; Jayant Kumar, Westford, all of Mass.

[73] Assignee: University of Massachusettes, Boston, Mass.

[21] Appl. No.: 08/929,382

[22] Filed: Sep. 15, 1997

[51] Int. Cl.$^6$ .................................................. B29D 11/00
[52] U.S. Cl. .......................... 264/1.29; 264/1.1; 264/2.6; 264/2.7
[58] Field of Search .................................. 264/1.24, 2.6, 264/1.25, 1.29, 2.7, 1.1; 427/163.2

[56] References Cited

U.S. PATENT DOCUMENTS

| | | | |
|---|---|---|---|
| 3,718,383 | 2/1973 | Moore . | |
| 3,819,782 | 6/1974 | Irie | 264/1.24 |
| 3,955,015 | 5/1976 | Ohtsuka et al. . | |
| 3,999,834 | 12/1976 | Ohtomo et al. . | |
| 4,581,252 | 4/1986 | Guerra et al. . | |
| 5,235,660 | 8/1993 | Perry et al. | 385/124 |
| 5,253,323 | 10/1993 | Koike et al. | 385/143 |
| 5,390,274 | 2/1995 | Toyoda et al. | 385/124 |
| 5,405,556 | 4/1995 | Liu | 264/1.7 |
| 5,593,621 | 1/1997 | Koike et al. | 264/1.29 |

FOREIGN PATENT DOCUMENTS

| 109586 | 5/1984 | European Pat. Off. | 427/163.2 |
|---|---|---|---|

OTHER PUBLICATIONS

Chakravorty, K.K., "Ultraviolet Defined Selective In–Diffusion of Organic Dyes in Polyimide for Applications in Optical Interconnection Technology," *Applied Physics Letters*, 61:1163–1165, (1992).

Ho, B.C., "Gradient–Index Polymer Fibers Prepared by Extrusion," *Polymer Journal*, 27:310–313 (1995).

Ishigure, Takaaki et al., "Graded–Index Polymer Optical Fiber for High–Speed Data Communication," *Applied Optics*, 33:4261–4266, (1994).

Koike, Yasuhiro, "High–Bandwidth Graded–Index Polymer Optical Fibre," *Polymer*, 32:1737–1745, (1991).

Koike, Yasuhiro et al., "High–Bandwidth Graded–Index Polymer Optical Fiber," *Journal of Lightwave Technology*, 13:1475–1489, (1995).

Koike, Yasuhiro et al., "Graded–Index Plastic Optical Fiber Composed of Methyl Methacrylate and Vinyl Phenylacetate Copolymers," *Applied Optics*, 29:2686–2691, (1990).

Kuzyk, M.G. et al., "Guest–Host Polymer Fibers for Nonlinear Optics," *Appl. Phys. Lett.*, 59:902–904, (1991).

Yamane, Masayuik et al., "Variable Refractive Index Systems by Sol–Gel Process," *Journal of Non–Crystalline Solids*, 148:606–613 (1992).

*Primary Examiner*—Mathieu D. Vargot
*Attorney, Agent, or Firm*—Fish & Richardson P.C.

[57] ABSTRACT

The invention features a method of making a gradient-index polymer rod involving the steps of: combining a polymer with an additive, wherein the refractive index of the polymer material is different than the refractive index of the additive material; extruding the polymer and the additive into a polymer rod having a substantially uniform index of refraction profile; and immersing the rod having the substantially uniform index of refraction profile in a non-solvent under conditions and for a time that enables the non-solvent to permeate the rod and out-diffuse a portion of the additive material, thereby producing the gradient-index polymer rod. The rod produced by the method can be drawn into a graded index polymer fiber. The invention also features a gradient-index polymer rod (or fiber) of condensation-type polymer that is doped with an additive material. The refractive index of the additive material is different than the refractive index of the polymer and the rod (or fiber) has a concentration profile of the additive that varies along the radial direction of the rod (or fiber) from the center to the surface of the rod (or fiber).

19 Claims, 6 Drawing Sheets

GRADIENT-INDEX POLYMER RODS AND FIBERS

STATEMENT AS TO FEDERALLY SPONSORED RESEARCH

This invention was made with Government support under N00014-97-C-0044 awarded by the Office of Naval Research. The Government has certain rights to this invention.

BACKGROUND OF THE INVENTION

This invention relates to graded-index polymer optical rods and fibers.

Optical fibers are used throughout the telecommunication industry for high speed transmission of data over large distances. Typically, the optical fibers are single-mode fibers made from inorganic glasses. The material properties of these glasses impose an upper limit of about 125 $\mu$m on the diameter of the fiber for a fiber having a reasonable flexibility. Because of these small diameters, splicing and interconnecting of such fibers is complex and time-consuming. As a result, single-mode glass fibers are inappropriate for short-haul data transmission applications, such as local area networks (LANs) or fiber to the home (FTTH), where multiple connections are required.

Polymer optical fibers (POFs) are an attractive alternative to glass fibers, because of their low cost, ease of handling, and good flexibility. Even at large diameters, POFs are flexible enough for efficient fiber splicing and beam insertion. The principal drawbacks of large-diameter POFs is the problem of modal dispersion and hence limited bandwidth.

Most POFs used in communication systems are of the step index (SI) type, i.e., they have a refractive index change at the core-cladding interface. Modal dispersion limits the bandwidth in most SI POFs to about 100 Mb/sec. This is too low for many telecommunication applications, such as, fiber distributed data interface (FDDI), synchronous digital hierarchy (SDH), and broad band integrated services digital network (B-ISDN). For example, the required bandwidth for current network applications such as Asynchronous Transfer mode (ATM), Fiber Channel and Ethernet are up to 1062 Mb/sec, with an interest in scaling these bandwidths to more than 4 Gb/sec.

Modal dispersion can be minimized by fabricating a POF with a varying refractive index profile along the transverse dimension of the POF, i.e., fabricating a graded-index (GI) POF. Typically, the GI POFs have a refractive index profile that varies quadratically along the radial dimension of the POF, with the refractive index being the largest at the center of the POF.

SUMMARY OF THE INVENTION

The invention features methods of making graded index (GI) polymer rods and fibers. First, a polymer rod is made by extruding together a polymer with at least one additive, where the polymer and at least one of the additives have different refractive indices. The polymer rod so produced has a uniform refractive index profile. Then, the polymer rod is soaked in a non-solvent (i.e., a solvent for one of the additives but not for the polymer) that permeates the rod and partially out-diffuses at least one of the additives from the rod. This results in an additive concentration that varies inversely with radial distance from the center of the rod, thereby producing a GI rod. After the GI rod is removed from the non-solvent and dried to harden the rod, it can be drawn to produce a graded index polymer optical fiber (POF). A supercritical fluid (SCF), such as supercritical $CO_2$, can be used as the non-solvent.

In general, in one aspect, the invention features a method of making a gradient-index polymer rod involving the steps of: combining a polymer with an additive, wherein the refractive index of the polymer material is different than the refractive index of the additive material; extruding the polymer and the additive into a polymer rod having a substantially uniform index of refraction profile; and immersing the rod having the substantially uniform index of refraction profile in a non-solvent under conditions and for a time that enables the non-solvent to permeate the rod and out-diffuse a portion of the additive material, thereby producing the gradient-index polymer rod. The method can include any of the following embodiments.

The method can further include the step of drying the gradient-index polymer rod to remove the non-solvent. The polymer can be a melt-processable amorphous polymer. The polymer can be a condensation-type polymer. The polymer can include polymethylmethacrylate, polystyrene, polycarbonate, Teflon® AF copolymer, or CYTOP™ polymer. The additive can be a halogenated aromatic compound. The non-solvent can include methanol. The non-solvent can include a supercritical fluid, such as supercritical $CO_2$. The non-solvent can include a second additive material that diffuses into the rod during the immersing step. The immersing step can be performed at a temperature less than about 45° C. A second additive can be combined with the polymer and the first-mentioned additive in the combining step, and extruded with the polymer and the first-mentioned additive in the extruding step.

A gradient-index polymer fiber can be made by drawing out the rod produced by the method, thereby forming the fiber. A gradient index lens can be made by cutting the rod produced by the method along a plane substantially perpendicular to its longitudinal axis, thereby producing the lens.

The polymer can be doped with a dye, such as a laser dye. A gradient-index polymer optical fiber amplifier can be made by drawing out the rod produced by the method in which the polymer is doped with laser dye, thereby forming the gradient-index fiber amplifier.

In general, in another aspect, the invention features a gradient-index polymer rod including a rod of a condensation-type polymer that is doped with an additive material. The refractive index of the additive material is different than the refractive index of the polymer and the rod has a concentration profile of the additive that varies along the radial direction of the rod from the center to the surface of the rod. The rod includes embodiments in which the polymer is a polycarbonate and the concentration profile is substantially quadratic and peaked at the center of the rod.

In general, in another aspect, the invention features a gradient-index polymer fiber including a condensation-type polymer fiber doped with an additive material. The refractive index of the additive is different than the refractive index of the polymer and the fiber has a concentration profile of the additive that varies along the radial direction of the fiber from the center to the surface of the fiber. The fiber includes embodiments in which the polymer is a polycarbonate and the concentration profile is substantially quadratic and peaked at the center of the fiber.

As used herein, a "non-solvent" is a compound that is a solvent for an additive in a polymer, but not a solvent for the polymer itself. For example, 1,3,5-tribromobenzene (an additive) can be doped into polymethylmethacrylate (a polymer) and methanol can be used as a non-solvent that permeates the polymethylmethacrylate and dissolves the 1,3,5-tribromobenzene without dissolving the polymethylmethacrylate. As used herein, "out-diffusion" of an additive from a polymer means the diffusion of the additive out of the polymer. As used herein, an "index" means a refractive index.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

An important advantage of the new methods is that it does not involve a polymerization step. Instead, a polymer is used as a starting material for the methods. Thus, byproducts from a polymerization reaction used to form the polymer, e.g., side products produced when forming condensation-type polymers, are removed prior to performing the methods. As a result, the methods can be used with a wide variety of polymers, including polymers produced from addition-type polymers, such as polymethylmethacrylates, or condensation-type polymers, such as polycarbonates.

The invention provide an easy and efficient methods for producing GI rods, which can be drawn to produce GI POFs. The method is fast, especially when a SCF is used as the non-solvent. Furthermore, the method can be used with a wide variety of additives since, for example, many halogenated aromatic compounds are soluble in supercritical $CO_2$. Supercritical $CO_2$ is also environmentally safe.

In addition to their use in making GI POFs, the GI polymer rods can be doped with laser dyes to make graded index polymer optical fiber amplifiers (GI POFAs). POFAs can be used in conjunction with POFs to provide gain in POF communication links. The GI polymer rods can also be doped with non-linear optical (NLO) dyes. Second-order NLO dyes can be aligned with external optical fields, providing a tunable birefringence in the rod.

The GI polymer rods can also be cut to produce planar gradient index (GRIN) lenses. In other applications, GI POFs can be used to build POF power splitters and directional couplers. In all applications, polymer rod and POF devices are flexible and easy to handle, allowing for facile interconnections, and thereby providing a cost advantage.

Other features and advantages of the invention will be apparent from the following detailed description, and from the claims.

DETAILED DESCRIPTION

The invention features methods of making graded index (GI) polymer rods and GI polymer optical fibers (POF), and the resulting rods and fibers themselves. The methods involve an extruding step, an out-diffusion step, and a drawing step.

In the extruding step, a melt-processable amorphous polymer is mixed with one or more additives that have refractive indices that are different than the refractive index of the polymer. The indices of different additives may also be different. The mixture is extruded together to produce a polymer rod having a uniform refractive index profile, i.e., the refractive index is the same at every position along the radial dimension of the rod. The diameter of the rods are typically about 3–7 mm, but can be larger.

In the out-diffusion step, the polymer rods are soaked in a non-solvent that permeates the rod and out-diffuses the additives. The out-diffusion produces a concentration gradient in which the concentration of the additives is greatest at the center of the rod and smallest at the edges of the rod. Corresponding to this concentration gradient is a refractive index profile that varies with radial distance from the center of the rod. After the out-diffusion process, the rod is removed from the non-solvent and dried to facilitate removal of non-solvent permeated within the rod, thereby hardening the rod. As a result, a GI polymer rod is produced.

In the drawing step, the GI polymer rod is heated and thereafter pulled by a pair of rollers to draw out the fiber. The drawn fiber has a typical diameter of about 100 to 1000 microns and a GI profile substantially similar to the GI profile of the polymer rod.

Photonic devices can also be fabricated using this method. These devices and the extruding, out-diffusion, and drawing steps will now be described in detail followed by specific examples.

Extruding Step

First, an appropriate polymer and one or more additives are selected. The polymer and at least one of the additives are selected to have different refractive indices. The index gradient in the final GI rod will vary directly with the difference between these refractive indices. If the index of the polymer is less than the index of the additives, the index of the final GI rod will decrease with radial distance from the center of the rod, and vice-versa if the index of the polymer is greater than the index of the additives. If additives are selected with indices both less than and greater than the index of the polymer, the index profile of the rod can both increase and decrease with radial distance from the center of the rod. In this case, the exact index profile depends on the relative diffusivities of the additives. To prevent modal dispersion in the resulting POFs, an index profile that decreases quadratically from the center of the rod is typically desired. Thus, an additive is chosen with an index greater than the index of the polymer. Refractive indices of different materials are well known in the art, see for example, R. C. Weast, ed., *CRC Handbook of Chemistry and Physics* (CRC Press, Inc., Boca Raton, Fla., 1984).

The polymer can be any melt-processable, amorphous polymer. Such polymers allow introduction of additives in the extrusion step and pulling of fibers from polymer rods in the drawing step. Preferably, the glass transition temperature ($T_g$) of the polymer is above about 150° C. Suitable polymers include polymethylmethacrylates (PMMAs), polystyrenes (PSs), polycarbonates (PCs) and high $T_g$, low loss fluorinated polymers such as bisphenol-AF based polycarbonate, Teflon® AF amorphous copolymers [of 2,2-bis(trifluoromethyl)-4,5-difluoro-1,3-dioxole and tetrafluoroethylene], and CYTOP™ polymers. PMMAs, PSs, and PCs are well known in the art. Optical quality grade PMMA, for example, can be obtained from Cyro Plastics (CT, USA).

Figure 1A:
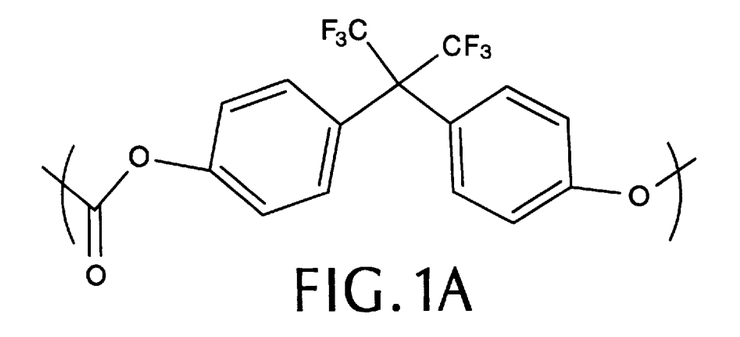
FIGS. 1A, 1B, and 1C are chemical structures for polymers.

Examples of high $T_g$, low loss fluorinated polymers mentioned above are shown in FIGS. 1A–1C. Bisphenol-AF based polycarbonate, shown in FIG. 1A, has a $T_g$ of about 169° C. This polymer can be synthesized by reacting commercially available 2,2-bis(4-hydroxyphenyl)-1,1,1, 3,3,3-hexafluoropropane (Aldrich) with fluorinated bisphenol-A, in diphenyl carbonate and heating from about 180° C. to about 300° C. under a vacuum of about 20–30 torr, as shown in FIG. 2. Alternatively, the reaction can take place in $COCl_2$ under ambient conditions, as also shown in FIG. 2.

Figure 1B:
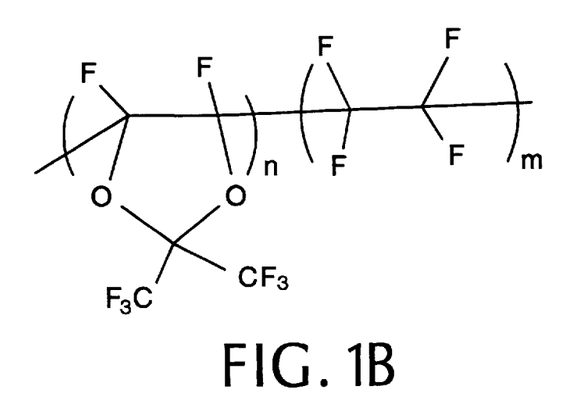
Figure 2:
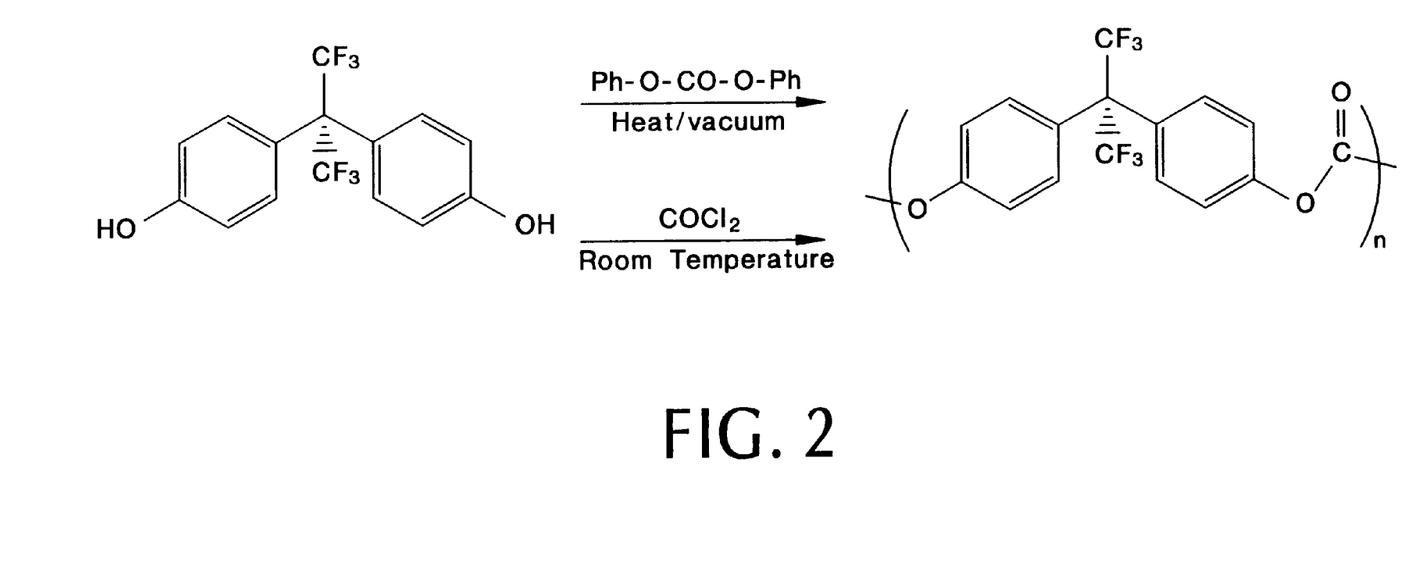
FIG. 2 is a synthetic procedure for making a bisphenol-AF based polycarbonate.

Teflon AF amorphous copolymers [of 2,2-bis(trifluoromethyl)-4,5-difluoro-1,3-dioxole and tetrafluoroethylene], shown in FIG. 1B, has a $T_g$ of about between 118° C. and 330° C. depending on the relative proportions of "n" and "m", e.g., $T_g$=120° C. for m=0.55 and n=0.45, $T_g$=260° C. for m=0.02 and n=0.98, $T_g$=330° C. for m=0.0 and n=1.0. Both of these polymers are commercially available from Dupont (DE, USA).

Figure 1C:
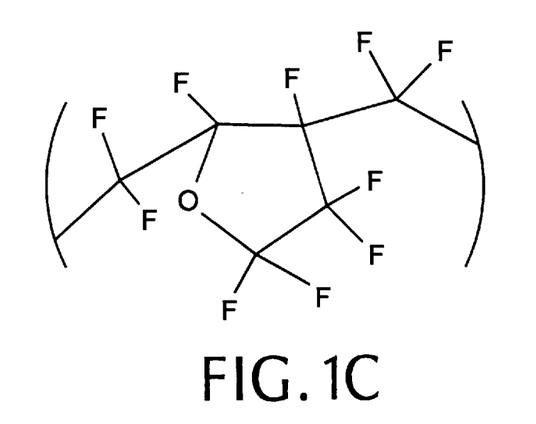

CYTOP™ polymer, shown in FIG. 1C, is commercially available from Asahi Glass Co. (Japan) and has a $T_g$ of about 108° C.

The additive or additives can be any compound having a refractive index different than that of the polymer and being soluble in a non-solvent used in the out-diffusion step. Suitable additives include halogenated aromatic compounds such as 1,3,5-tribromobenzene and 1,2,4,5-tetrabromobenzene (TBB), benzylbutylphthalate, and diphenyl sulfide. The use of additives that are symmetric prevent birefringence arising from the orientation of the additive during extrusion and heat drawing. Rather than a single additive, multiple additives can also be doped into the polymer. This may be desirable since doping multiple additives into the polymer will generally produce a more-complicated index profile in the final GI rod that corresponds to the indices and diffusion rates of the multiple additives. For example, a more-complicated index profile may increase and then decrease along the radial direction of the rod, i.e., the index may be greatest at a position between the center and edge of the rod.

Once a polymer and at least one additive have been selected, and after they are purified, the polymer and additive(s) are extruded together. In general, dried pellets of purified polymer and recrystallized additive are continuously combined and mixed under high temperature (e.g., in a range from about 140° C. to 250° C.) and passed through a high temperature (e.g., in a range from about 140° C. to 250° C.), high-pressure (e.g., in a range from about 800 psi to 1200 psi) rod die mold. Molten rods exit the mold and are cooled in, for example, a water bath. The process typically produces transparent amorphous polymer rods having a uniform distribution of additive. The diameter of the rod typically depends on the size of the extruder barrel. For example, a 0.75 inch extruder barrel can have a rod die mold with a diameter of up to about 5 mm. Thicker rods (e.g., diameters of about 1.5 cm) can be produced from the rod die molds used with a 2 inch extruder barrel. Many methods of extrusion are known in the art, including for example, using a single screw Brabender extruder or a counter-rotating twin screw extruder. For more information on extrusion methods, see, for example, F. Hensen, ed., *Plastics Extrusion Technology* (Hariser Publishers, NY 1988).

In an alternative extruding step, purified polymer and recrystallized additive can be added in a batch process to a capillary rheometer to fabricate the doped polymer rod. Suitable rheometers include a Goetfert 2001 (Goetfert, Inc., SC, USA) or an Instron (Instron Corp., Mass., USA) capillary rheometer.

To improve the environmental stability of the polymer rods and fibers produced by the invention, stabilizers including antioxidants, such as phenol or butylated hydroxytoluene (BHT), can be added to the polymer and additive(s) during the extruding step.

Out-Diffusion Step

In the out-diffusion step, the doped polymer rods are soaked in a non-solvent bath. The non-solvent is a solvent for the additive but not for the polymer. The non-solvent swells and permeates the polymer, and thereafter out-diffuses portions of the additives into the bath. During this step the rod becomes soft, as the non-solvent tends to plasticize the polymer. After a sufficient period, which depends on the choice of non-solvent and the desired index profile, the rod is removed from the bath and vacuum dried to harden the rod and remove any non-solvent remaining within the rod. The out-diffusion process can be confirmed by the presence of additive in the non-solvent bath.

The additive must be soluble in the non-solvent and the non-solvent should be able to penetrate the core of the polymer rod in a reasonable time. Non-solvents can include organic solvents such as methanol, ethanol, and hexane. Experiments show that methanol requires about three days to penetrate the core of a 3 mm diameter PMMA polymer rod under ambient conditions, whereas ethanol and hexane require at least two weeks to penetrate the core of a 3 mm diameter PMMA polymer rod under ambient conditions. The time required to penetrate the center of the polymer rod and out-diffuse additive can be decreased by increasing the temperature of the non-solvent bath from ambient. However, if the temperature is too high, the polymer rod loses its transparency. Experiments with organic non-solvents indicate that bath temperatures less than about 45° C. prevent the loss of transparency.

Supercritical fluids (SCFs) can also be used as the non-solvent to out-diffuse additives from the polymer rod. SCFs are excellent solvents for most organic compounds and many SCFs are environmentally friendly. Furthermore, many SCFs can swell amorphous polymers while retaining the dimensional integrity of the polymer. To perform the out-diffusion step with an SCF, the doped polymer rod is placed in a sealed cell having an adjustable temperature, an inlet valve to provide an SCF non-solvent, and an outlet valve. First, non-solvent is introduced into the cell until a pressure is reached that is above the critical pressure. Concurrently, the temperature is brought to a temperature above the critical temperature. Under these supercritical conditions, the non-solvent swells the polymer rod and out-diffuses the additive. Thereafter, conditions in the cell are brought below critical conditions, thereby restoring the dimensional integrity of the polymer rod. Generally, the out-diffusion time will be shorter if a SCF non-solvent is used rather than a non-SCF non-solvent. Typically, the out-diffusion time for a SCF non-solvent can range from about 1 minute to 1 hour. For a general reference on Supercritical Fluid Extraction, see, for example, M. A. McHugh and V. J. Krukonis, *Supercritical Fluid Extraction: Principle and Practice* (Butterworth Publishers, Stoneham, Mass., 1986).

Compounds that can be used under supercritical conditions as a non-solvent include $CO_2$, $SF_6$, $C_2H_6$, $CCl_3F$, $CClF_3$, $CHF_3$, and iso-propanol. Halogenated aromatic compounds, which can be used as the index additive, are particularly soluble in supercritical $CO_2$. For example, 1,2,4,5-tetrabromobenzene (TBB) has a solubility in supercritical $CO_2$ of about 8–15 percent by weight at 25° C. In general, the swelling of polymers in SCFs can be manipulated by varying pressure and temperature. However, the dimensional integrity of the polymer can be retained only by avoiding very high pressures and temperatures. For example, the surface of a PMMA rod melts at about 68° C. when supercritical $CO_2$ pressure is higher than 100 atm. Experiments indicate that the swelling of PMMA in $CO_2$ is optimal at temperatures of between about 20° C. and 45° C., or more particularly about 42° C., and pressures between 80 atm and 220 atm, more particularly about between 140 and 180 atm. At these temperatures, the swelling of PMMA is reversible as the pressure is varied above and below the critical pressure of $CO_2$, which is 72.0 atm.

The table below lists the critical properties of a number of compounds, which can be used as non-solvents to extract additives from polymer rods. These compounds can be used by themselves or in conjunction with modifiers, such as methanol, to form the supercritical non-solvent. The table respectively lists the critical temperature ($T_c$) and critical pressure ($P_c$) for each compound.

| | Critical Properties | |
|---|---|---|
| Compound | $T_c$ (C. °) | $P_c$ (atm) |
| $CO_2$ | 31.1 | 72.0 |
| $SF_6$ | 45.5 | 38.0 |
| $C_2H_6$ | 32.3 | 48.2 |
| $CHF_3$ | 26 | 46.9 |
| $CCl_3F$ | 198.1 | 43.5 |
| $CClF_3$ | 28.9 | 38.7 |
| iso-propanol | 235.2 | 47.0 |

To produce a desired GI profile for the polymer rod during the out-diffusion step, many factors can be varied. The GI profile of the rod depends on the refractive indices of the polymer and additive, the doping concentration of the additive, the diameter of the rod, the solubility and diffusivity of the additive in the non-solvent, the extraction time, and the extraction conditions (i.e., temperature and pressure), which can be time-varying. To optimize these factors, GI rods are produced under a number of different conditions and each of the rods are carefully characterized. Many techniques can be used to characterize the GI rods.

For example, the microstructure of the GI rods can be studied using Scanning Electron Microscopy (SEM) and the microchemistry, i.e., local additive concentrations, can be studied by Energy Dispersive X-ray Spectrometry (EDXS). Samples for these techniques are prepared by cutting the rods along a plane substantially perpendicular to the rod's longitudinal axis and polishing the exposed surfaces. In EDXS, an electron beam impinges the sample surface and generates X-rays having energies characteristic of the elemental content at the impinged surface. This information can be used to map out additive concentrations. For a general reference on these techniques, see Goldstein J. I. et al., *Scanning Electron Microscopy and X-Ray Microanalysis* (Plenum Press, New York, 1992).

The index profile of the GI rods can also be characterized directly using optical techniques. For example, a small slice can be cut from the GI rod and used as a thin optic, e.g., a lens. Coherent light passing through the optic will be bent according to the refractive index profile of the optic. By measuring the intensity profile of the coherent light at various distances beyond the optic, the refractive index profile of the optic can be determined. Other techniques include longitudinal and transverse interferometric techniques as described by Ohtsuka and Koike (*Appl. Opt.*, 24:4316, 1985 and *Appl. Opt.*, 19:2866, 1980).

Figure 3A:
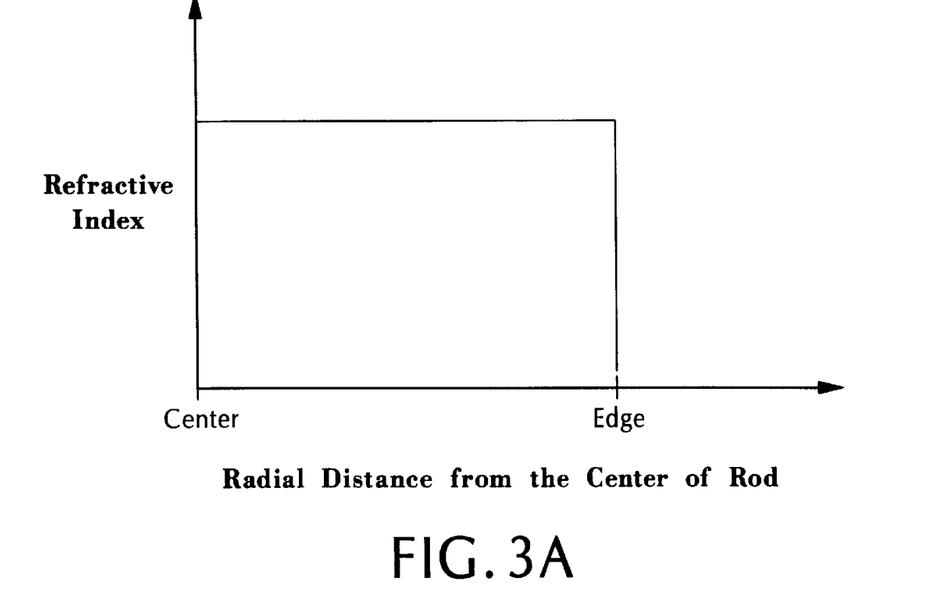
FIGS. 3A and 3B are schematic plots of an index profile for a doped polymer rod before and after the out-diffusion step, respectively.
Figure 3B:
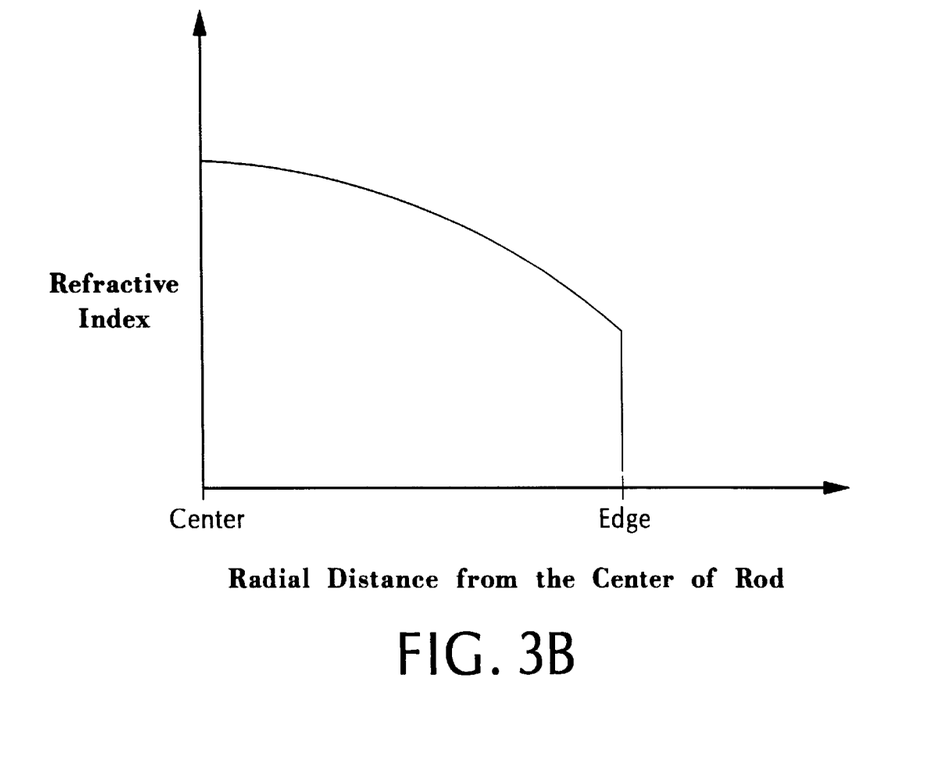

Generally, the out-diffusion step produces an additive concentration that decreases smoothly from the center of the rod, as shown schematically in FIGS. 3A (before the out-diffusion step) and 3B (after the out-diffusion step). The index profile will correspond to the concentration profile of the additive. More complicated index profiles can be made by doping multiple index additives into the rod. For example, if two additives having different diffusivities are uniformly doped into the rod and then subjected to a non-solvent, the additives will diffuse out from the rod at different rates. Depending on the relative index values for the additives, the index profile of the rod so produced can have a local minima or maxima at some non-zero radial distance from the center of the rod. Alternatively, or in addition, another additive(s) can be dissolved into the non-solvent prior to the out-diffusion step. Then, during the out-diffusion step, the additive(s) in the non-solvent will diffuse into the rod and the additive(s) doped into the rod will diffuse out from the rod. The resulting concentration gradients in the rod for the different additives can produce desired index profiles that are quite complex. It may also be possible to perform multiple out-diffusion steps with non-solvents that are solvents for different additives.

The out-diffusion step may also be enhanced by mixing the non-solvent with a small amount of solvent for the polymer. For example, experiments indicate that adding about 1%–2% of chloroform, which is a solvent for PMMA, increases the rate of out-diffusion without degrading PMMA polymer.

Drawing Step

Figure 4:
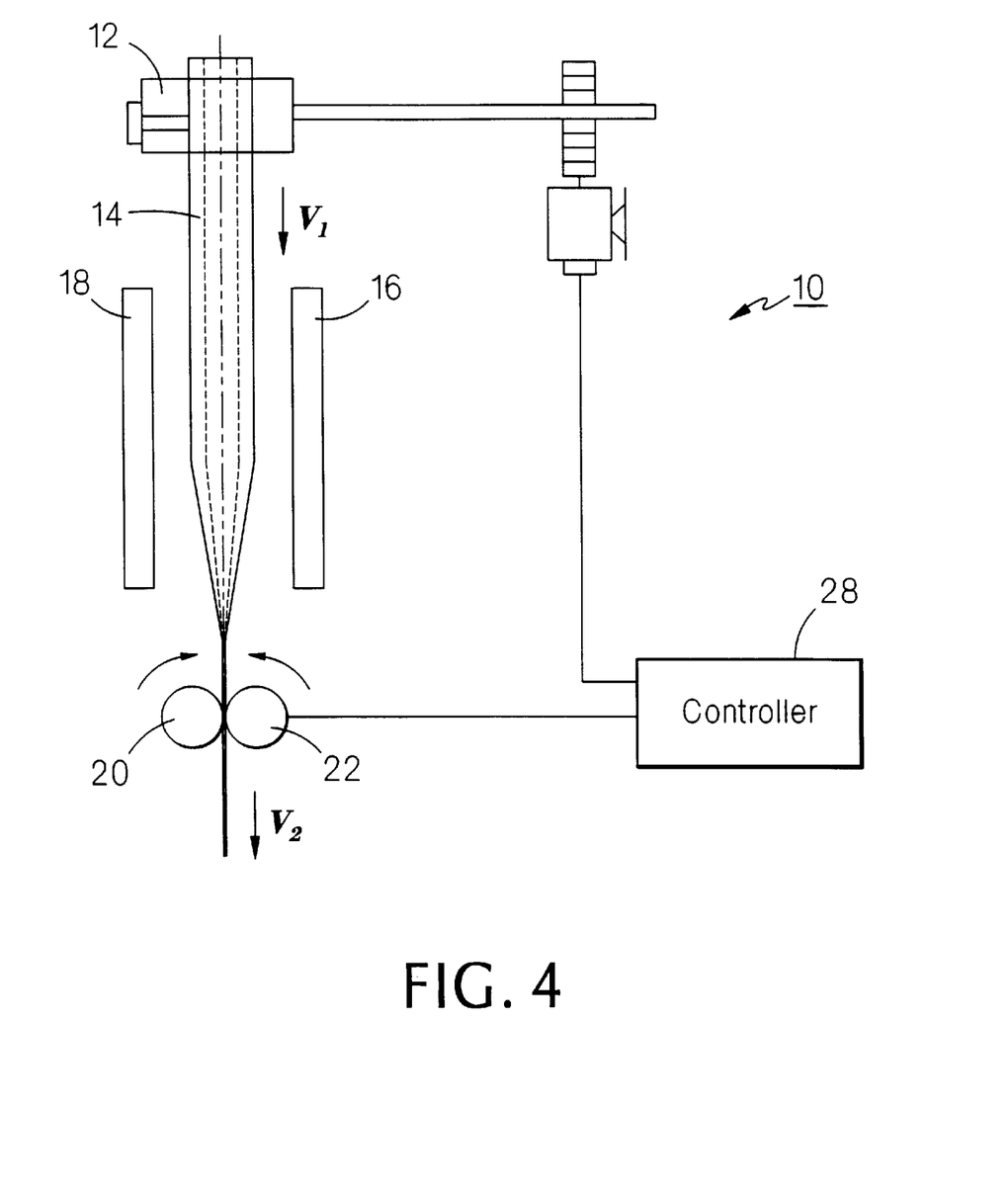
FIG. 4 is a schematic of a drawing apparatus.

To draw the GI polymer rod into a GI polymer optical fiber (POF), the rod is passed through a fiber drawing system 10, as shown in FIG. 4. System 10 includes a feeding mechanism 12 that draws the polymer rod 14 into system 10 and feeds the rod through a pair of heating elements 16 and 18 at a speed $V_1$. Elements 16 and 18 typically heat rod 14 to a temperature about 40° C. to 100° C. higher than the $T_g$ of the polymer rod, e.g., PMMA is heated to a temperature in the range of about 120° C. to 160° C. At this temperature, polymer rod 14 becomes soft. The soft rod is connected to a pair of rolling elements 20 and 22 that pull the rod at a speed $V_2$, which is greater than $V_1$. This difference in speed draws the soft rod into a fiber having a diameter smaller than the diameter of the rod. A control unit 28 optimizes speeds $V_1$ and $V_2$, and the temperatures of heating elements 16 and 18 in order to produce a fiber having a desired diameter. Other fiber drawing systems are also known in the art. For a reference on fiber drawing systems, see T. Ishigure et al., (*J. Lightwave Technology*, 13:1686–1691, 1995).

In general, control unit 28 insures that GI rod 14 sees conditions that are radially symmetric about the center of the GI rod. In this case, the refractive index profile of the fiber is substantially similar to the refractive index profile of the GI rod. For example, the index profile of a POF drawn from a rod having an index that smoothly decreases from a maximum at the center of the rod to a minimum at the edge of the rod will have an index profile that varies smoothly from the same maximum at the center of the fiber to the same minimum at the edge of the rod. Even in other cases, the drawing step produces a GI POF having a refractive index profile that deviates only slightly from the refractive index profile in the GI rod. The techniques previously described for characterizing GI rods can also be used to characterize the GI POFs to determine these deviations. Alternatively, or in addition, the drawing process can be modelled numerically using the Semi-Implicit Method for Pressure Linked Equations Revised (SIMPLER) as described in Patankar S. V., *Numerical Heat Transfer and Fluid Flow* (Hemisphere Publishing Corp., New York, 1980).

Photonic Devices

In addition to drawing the GI polymer rod into a GI POF useful for fiber optic communication, the GI rods can also be used to make other photonic devices. For example, gradient refractive index (GRIN) lenses can be fabricated from GI rods by cutting the rods along a plane substantially perpendicular to the rods' longitudinal axes and polishing the exposed surfaces. Planar GRIN lenses are frequently used as part of optoelectronic interconnects.

Other devices such as optical power splitters and directional couplers can also be made from the GI fibers. In these devices, two optical fibers are positioned in close proximity so that propagating modes in the two fibers are coupled. Under such conditions, power is exchanged between the two fibers. Thereafter, the two fibers extend in different directions. The length over which the two fibers are proximal to one another controls the relative power in each fiber as they extend in the different directions. These devices can be made, for example, by splitting the ends of a GI POF into a "Y" and splicing the ends of the "Y" to other fibers using standard techniques. The GI POFs can be spliced to glass fibers or to other POFs.

Also, POF active devices can be made by doping non-linear optical (NLO) dyes into the rod during the extruding step. Second order NLO chromophore doped and aligned in a fiber can cause a birefringence in the fiber when a field is applied. The birefringence can be used to align the polarization state of the propagating light. The long path lengths of the POF enhances the performance of the active device.

It is also possible to make GI polymer optical fiber amplifiers (POFAs) by doping laser dyes into the polymer rod. The GI profile reduces losses in the POFA associated with modal dispersion. Laser dyes include 4-(Dicyanomethylene)-2-methyl-6-(p-dimethylaminostyrl)-4H-pyran (DCM), Rhodamine B (RB), Rhodamine 6G (R6G), Pyromethene, and many others. Commercially available dyes, such as these, have absorption and emission spectra that cover any wavelength in the visible region and near IR. Thus, efficient optical amplification by the POFAs is possible over a wide wavelength range.

GI POFAs are made by adding small amounts (typically 10–100 ppm) of thermally stable laser dye to the polymer before the extruding step. Depending on the solubility of the laser dye in the non-solvent, the out-diffusion step may produce a dye concentration gradient, which may or may not be desired. Alternatively, or in addition, laser dye can be dissolved in the non-solvent and diffused into the polymer rod during the out-diffusion step. These dye-containing rods are then drawn into fibers.

EXAMPLES

Example 1

GI Polymer Rods using Methanol as the Non-Solvent

Optical quality (lens) grade PMMA (Acrylite H12-033-000), for use as the polymer, was obtained from Cyro Plastics. 1,2,4,5-tetrabromobenzene and 1,3,5-tribromobenzene, for use as additives, were purchased from Aldrich Chemicals. PMMA solutions of 1,2,4,5-tetrabromobenzenes and 1,3,5-tribromobenzene were made and cast on glass slides to study the optical quality and refractive indices of the PMMA composites. These bromobenzene additives can be loaded up to 15 wt % in PMMA without phase segregation. Thermal characteristics of the PMMA/bromobenzene composites were studied using Thermogravimetric Analysis (TGA). TGA indicated that tribromobenzene sublimes at about 120° C. and that tetrabromobenzene melts at about 178° C. and is very stable up to about 300° C. Because of its increased thermal stability, tetrabromobenzene (TBB) was used as the additive in the remainder of this example.

PMMA was dried overnight in a vacuum oven at 70° C. to remove any moisture. TBB was recrystallized from ethanol to obtain white needle-like crystals. Dried PMMA pellets were then mixed with 5 wt % of TBB in a blender. The mixture was then passed through a single screw Brabender extruder.

The extruder had a 0.75" barrel with three consecutive heating zones and a 7.5 mm circular rod die at the exit of the barrel with a single heating zone. The pressure at the rod die was measured using a melt pressure gauge. The temperature zones in the barrel were set to 165° C., 170° C., and 175° C., respectively, while the temperature zone in the rod die was set to 180° C. The extruder includes a plasticating barrier screw for driving the mixture through the barrel toward the rod die. The screw had a length to diameter (L/D) ratio of about 24:1. The screw speed was set at 20 rpm to achieve optimum output and diameter of the extrudate. By passing a colored plastic pellet through the extruder, the residence time of material in the extruder was observed to be 75 seconds at 20 rpm. Before extruding the TBB/PMMA mixture, the extruder was first flushed by extruding excess amounts of cheap quality PMMA for about 1 to 1.5 hours followed by optical quality grade PMMA for about 30 minutes. This removes impurities and also establishes an equilibrium temperature distribution along the extruder.

The extruder produced molten TBB/PMMA that exits from the rod die and was pulled by a pair of rollers into a water bath. Once in the water bath, the still-molten TBB/PMMA was cut into about 5–6 foot rods. The water bath (6 ft in length) cooled the molten rods for about 1–2 minutes and thereafter an air drier removed water from the surface of the rods. Highly transparent rods were produced when the water bath temperature was in the range of about 80–90° C. and the distance between the extruder die and the water bath was within the range of about 20–30 cm range. These parameters minimized uneven cooling of the rods, which can reduce optical quality. The cooled rods had a diameter of 3.1 mm and a uniform refractive index profile. Since TBB/PMMA is pulled from the rod die while molten, the rod is drawn into a diameter smaller than the diameter of the rod die.

For the out-diffusion step, the cooled TBB/PMMA rods were then placed in a non-solvent bath of methanol for 75 hours. Times shorter than 75 hours were also tried. During this time, methanol permeated the core of the rods and the rods became very soft. The temperature of the non-solvent bath was in the range of about 25–26° C. The rods, which remained optically transparent, were then removed from the bath and dried at room temperature for one day and then vacuum dried overnight, at which point the rods were again hard. After the out-diffusion step, white crystals were present in the non-solvent bath indicating the presence of TBB and implying that the methanol non-solvent had out-diffused TBB from the rods.

The microstructure of the rods was studied using a Scanning Electron Microscope-SEM (AMRAY 1400 with NIH image computer software). Samples for SEM were made by cutting the rods along the radial direction with rotating diamond coated knife, followed by polishing the nascent surface with a silicon carbide based rotating disc having a 5 μm surface roughness and then polishing the nascent surface using 0.3 μm alumina slurry dispersed on a rotating cloth material. The microstructure image was obtained at 10 kV acceleration voltage to avoid polymer degradation. The samples showed fairly smooth morphology at low magnification (100×). At high magnification (100×), a small number of microvoids having sizes less than 0.2 μm were observed. The microvoids are artifacts that may be associated with sample preparation.

Figure 5:
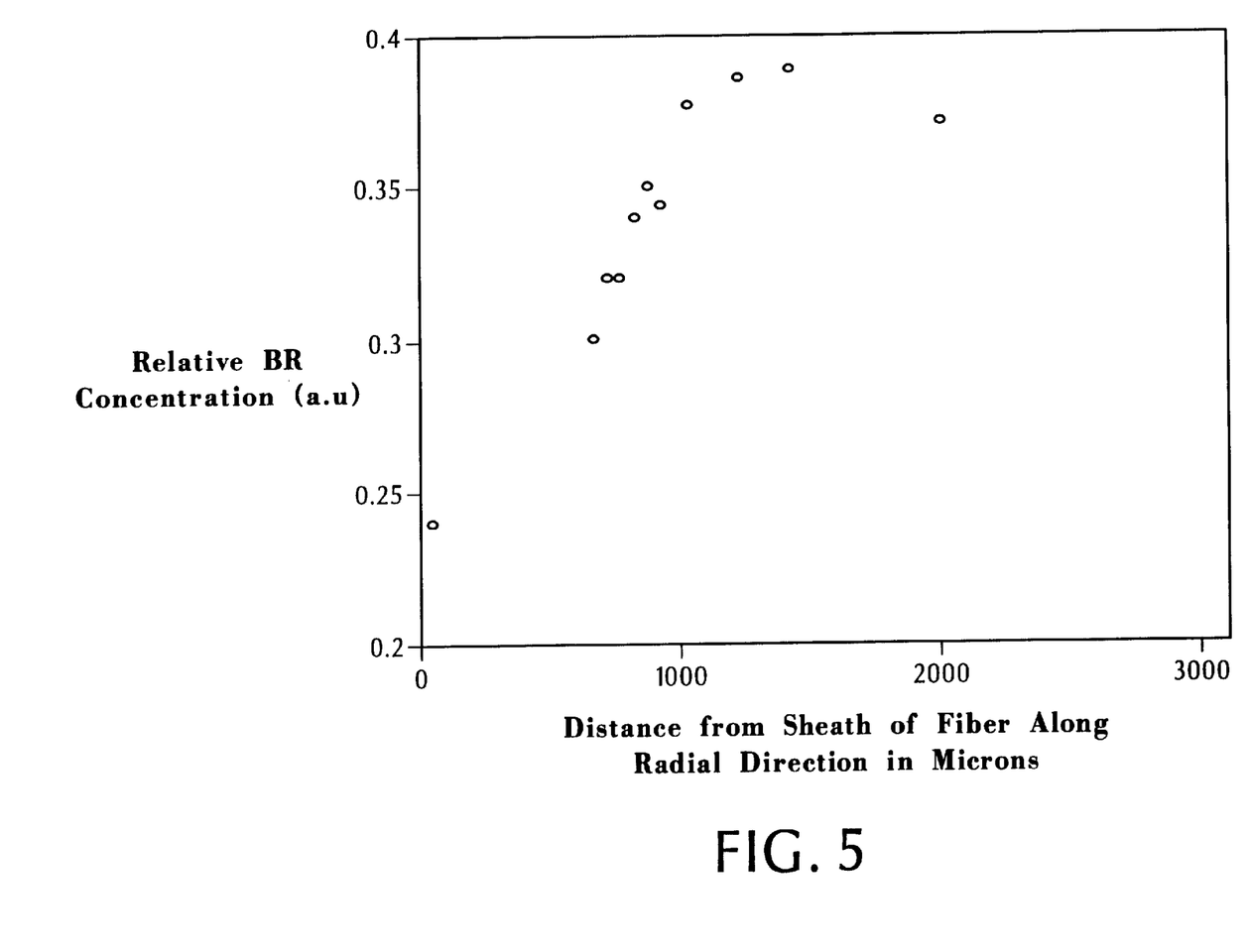
FIG. 5 is a plot of Energy Dispersive X-ray Spectroscopy (EDXS) data.
Figure 6A:
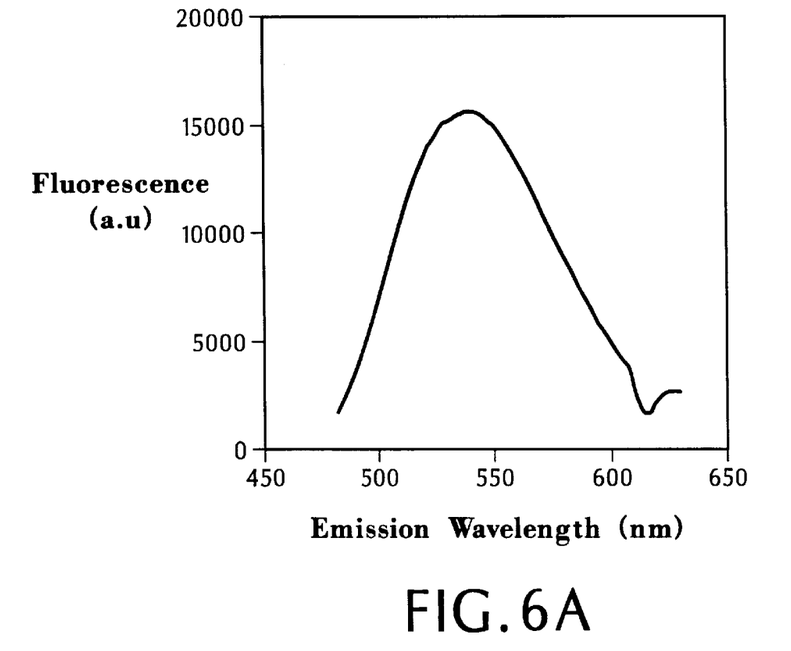
FIGS. 6A and 6B are plots of emission spectra from dye doped polymer rods.
Figure 6B:
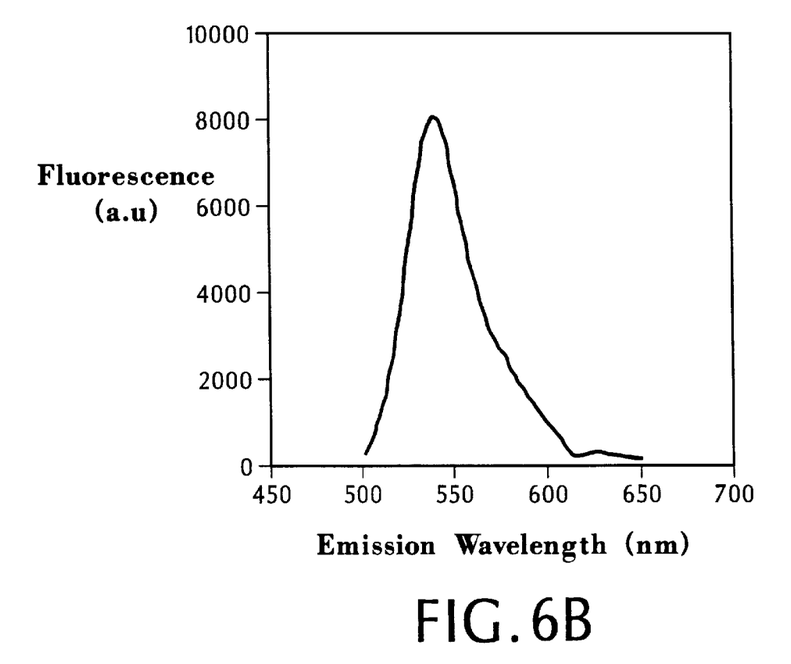

The microchemistry of the rods was studied with a Energy Dispersive X-ray Spectrometer (EDXS-by Tracor Northern with DTSA computer software). The electron beam had an energy of 10 kV and a spot size of 50 microns. The magnification of the spectrometer was set to 1000 times and the resolution of the detector was 158 eV. Sample were prepared in the same way as samples were prepared for SEM. The electron beam was directed to a sample exposing a transverse face of a rod. The EDXS spectra includes data corresponding to Bromine (Br) concentration (and hence TBB concentration) in the region of the sample excited by the electron beam. To map out the Br concentration along the radial direction, EDXS spectra was collected at multiple regions of the sample. The results are shown in FIG. 5, which plots relative Br concentration versus the position of the electron beam along the 3.1 mm diameter of the rod. The results show a quadratic Br concentration profile having a maximum at the center of the rod. These results are indicative of a TBB/PMMA rod having a graded refractive index profile.

Example 2

GI Rods using SC $CO_2$ as the Non-Solvent

TBB/PMMA rods having a uniform refractive index profile were prepared as described in Example 1. The rods were then placed in a pressure cell and the pressure cell filled with $CO_2$. The temperature in the cell was varied in the range between 40–55° C. and the pressure in cell was varied in the range between 2000–3000 psi. Under these conditions $CO_2$ is a supercritical fluid. The rods were subjected to supercritical conditions for times ranging from 1 minute to 1 hour. At temperatures above 50° C., the rods become foamy within 5 minutes, i.e., they expand and become porous and opaque, whereas, at temperatures lower than about 45° C., the rods maintained their optical quality. Under all of the above conditions TBB was detected as white crystals in the $CO_2$ after the rods were subjected to SC $CO_2$, indicating the out-diffusion of TBB from the rods.

Example 3

Fabrication of Polymer Optical Fiber Amplifier Preforms

PMMA and a 0.5 mmol fraction of 4-(Dicyanomethylene)-2-methyl-6-(p-dimethylaminostyrl)-4H-pyran (DCM) were dissolved in chloroform. This solution was filtered through 0.2 μm Gelman membrane filters and then cast on a clean container to produce a thick sheet of laser dye doped PMMA. This sheet was dried under vacuum and then diluted with pure PMMA in an extruder to produce laser dye doped PMMA rods with $10^{-5}$ to $10^{-6}$ mole fraction of laser dye in the polymer. The extruder and its operating conditions were the same as that described in Example 1. The optical quality of the dye doped rods was excellent. The procedure above was also performed with the laser dye Rhodamine 6G to produce dye doped rods also having excellent optical quality. FIGS. 5A (DCM) and 5B (Rhodamine) show light emission from the dye doped rods when excited with an Ar+ laser at 514 nm. These rods can be used as preforms that are drawn into optical fiber amplifiers.

Example 4

GI Rods using SC $SF_6$ as the Non-Solvent

GI rods are produced in the same way as in Example 2 except that $SF_6$ is used as the supercritical non-solvent rather than $CO_2$. Parameters similar to those used for SCF $CO_2$ are also used, i.e., temperatures in the range of about 40–55° C. and pressures in the range of about 2000–3000 psi.

Example 5

Fabrication of Planar GRIN Lenses

GI rods are produced as described in any of Examples 1, 2 or 4. The rods are then cut along a plane substantially perpendicular to the rods' longitudinal axes using a rotating diamond coated knife, thereby producing planar GRIN lenses. The nascent surfaces of the lenses are then polished using a silicon carbide based rotating disc having a 5 μm surface roughness followed by using a 0.05 μm alumina slurry dispersed rotating cloth material. The length the lenses vary from about 5 mm to 2 cm.

Example 6

Rods made from Condensation-Type Polymers

GI rods are produced in the same way as in Example 1, 2, 4, or 5 except that condensation-type polymers such as polycarbonates are used as the polymer in the extruding step instead of the addition-type polymer PMMA. The polymer is chosen so that is has a glass transition temperature ($T_g$) greater than about 150° C.

Other Embodiments

It is to be understood that while the invention has been described in conjunction with the detailed description thereof, that the foregoing description is intended to illustrate and not limit the scope of the invention, which is defined by the scope of the appended claims. For example, in some cases the diameter of the die mold in the extruding step is small enough to directly form a polymer optical fiber. In this case, the drawing step is unnecessary.

Other aspects, advantages, and modifications are within the scope of the following claims.

What is claimed is:

1. A method of making a gradient-index polymer rod, the method the steps of:

combining a polymer with an additive, wherein the refractive index of the polymer material is different than the refractive index of the additive material;

extruding the polymer and the additive into a polymer rod having a substantially uniform index of refraction profile; and immersing the rod having the substantially uniform index of refraction profile in a non-solvent under conditions and for a time that enables the non-solvent to permeate the rod and out-diffuse a portion of the additive material, thereby producing the gradient-index polymer rod.

2. The method of claim 1, further comprising the step of drying the gradient-index polymer rod to remove the non-solvent.

3. A method of making a gradient-index polymer fiber, the method comprising the steps of:

making a gradient-index polymer rod as described in the method of claim 1; and drawing out the gradient-index polymer rod to form the gradient-index polymer fiber.

4. The method of claim 1, wherein the polymer is a melt-processable amorphous polymer.

5. The method of claim 1, wherein the polymer comprises polymethylmethacrylate, polystyrene, polycarbonate, poly[2,2-bis(trifluoromethyl)-4,5-difluoro 1,3-dioxoline-cotetrafluoroethylene], or poly[2,2,4,5-tetrafluoro 1,3-dioxol-4,5-yl tetrafluoroethylene].

6. The method of claim 1, wherein the additive is a halogenated aromatic compound.

7. The method of claim 1, wherein the non-solvent comprises methanol.

8. The method of claim 1, wherein the non-solvent comprises a supercritical fluid.

9. The method of claim 8, wherein the non-solvent is supercritical $CO_2$.

10. The method of claim 1, wherein the immersing step is performed at a temperature less than about 45° C.

11. A method of making a gradient index lens, the method comprising the steps of:

making a gradient index polymer rod as described in the method of claim 1; and cutting the rod along a plane substantially perpendicular to its longitudinal axis to produce the lens.

12. The method of claim 1, wherein a second additive is combined with the polymer and the first-mentioned additive in the combining step and extruded with the polymer and the first-mentioned additive in the extruding step.

13. The method of claim 1, wherein the non-solvent includes a second additive material that diffuses into the rod during the immersing step.

14. The method of claim 13, wherein the second additive material comprises a laser dye.

15. The method of claim 1, wherein the polymer is doped with a dye.

16. The method of claim 15, wherein the polymer is doped with a laser dye.

17. A method of making a gradient-index polymer optical fiber amplifier, the method comprising the steps of:

making a gradient-index polymer rod as described in the method of claim 16; and drawing out the gradient-index polymer rod to form the gradient-index polymer optical fiber amplifier.

18. The method of claim 1, wherein the polymer is a condensation polymer.

19. The method of claim 18, wherein the polymer is a polycarbonate.

* * * * *

UNITED STATES PATENT AND TRADEMARK OFFICE
CERTIFICATE OF CORRECTION

PATENT NO.       : 5,935,491  
APPLICATION NO.  : 08/929382  
DATED            : August 10, 1999  
INVENTOR(S)      : Sukant Tripathy et al.

It is certified that error appears in the above-identified patent and that said Letters Patent is hereby corrected as shown below:

On the title page item (73), Assignee replace "Massachusettes" with -- Massachusetts --

Signed and Sealed this

Twentieth Day of February, 2007

JON W. DUDAS  
*Director of the United States Patent and Trademark Office*